(12) United States Patent
Li et al.

(10) Patent No.: US 11,540,214 B2
(45) Date of Patent: Dec. 27, 2022

(54) TIMER ADJUSTMENT METHOD AND DEVICE

(71) Applicant: BEIJING XIAOMI MOBILE SOFTWARE CO., LTD., Beijing (CN)

(72) Inventors: Yanhua Li, Beijing (CN); Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/281,572

(22) PCT Filed: Oct. 17, 2018

(86) PCT No.: PCT/CN2018/110662
§ 371 (c)(1),
(2) Date: Mar. 30, 2021

(87) PCT Pub. No.: WO2020/077567
PCT Pub. Date: Apr. 23, 2020

(65) Prior Publication Data
US 2021/0392578 A1    Dec. 16, 2021

(51) Int. Cl.
*H04W 52/02*    (2009.01)
(52) U.S. Cl.
CPC ............... *H04W 52/0216* (2013.01)
(58) Field of Classification Search
CPC .......... H04W 52/0216; H04W 72/042
See application file for complete search history.

(56) References Cited

U.S. PATENT DOCUMENTS

| 2014/0198762 | A1 | 7/2014 | Yang et al. |
| 2019/0053159 | A1* | 2/2019 | Wei ............ H04W 52/0216 |
| 2019/0215900 | A1* | 7/2019 | Pan ............ H04L 27/2666 |

FOREIGN PATENT DOCUMENTS

| CN | 102440051 A | 5/2012 |
| CN | 102469445 A | 5/2012 |
| CN | 105472716 A | 4/2016 |
| CN | 107548079 A | 1/2018 |

OTHER PUBLICATIONS

International Search Report to PCT/CN2018/110662 dated Jul. 18, 2019 with English translation, (4p).

* cited by examiner

*Primary Examiner* — Keith Ferguson
(74) *Attorney, Agent, or Firm* — Arch & Lake LLP

(57) ABSTRACT

The present disclosure provides a method and an apparatus for timer adjustment. A base station configures a band width part (BWP) inactivity timer for a terminal. When determining to adjust a duration of the BWP inactivity timer, the base station configures timer adjustment information for the terminal. The timer adjustment information is configured to adjust the duration of the BWP inactivity timer. The base station sends the timer adjustment information to the terminal. The terminal adjusts the duration to the BWP inactivity timer according to the timer adjustment information.

19 Claims, 9 Drawing Sheets

TIMER ADJUSTMENT METHOD AND DEVICE

This application is the U.S. national phase application of International Application No. PCT/CN2018/110662, filed on Oct. 17, 2018, the entire contents of which are incorporated herein by reference for all purposes.

TECHNICAL FIELD

The present disclosure relates to a field of communication technology, and particularly to a method and an apparatus for timer adjustment.

BACKGROUND

In a new generation of communication system, a carrier bandwidth may be divided into multiple Band Width Parts (BWPs). A terminal may be configured with multiple BWPs at the same time, but there may be only one activated downlink BWP and one activated uplink BWP in a serving cell at the same time. If the terminal is configured with a BWP inactivity timer, it means that automatic rollback from the currently activated BWP to the default BWP or the initial BWP is enabled. Therefore, it becomes particularly important how to improve the efficiency of BWP automatic rollback. However, there is no optimization solution for improving the efficiency of BWP automatic rollback in the related art.

SUMMARY

According to a first aspect of the present disclosure, a method for timer adjustment is provided. The method is applied to a base station. The base station configures a BWP inactivity timer for a terminal. The method includes that the base station determines to adjust a duration of the BWP inactivity timer. Additionally, the base station configures timer adjustment information for the terminal. The timer adjustment information is configured to adjust the duration of the BWP inactivity timer. Further, the base station sends the timer adjustment information to the terminal, so that the terminal adjusts the duration of the BWP inactivity timer according to the timer adjustment information.

According to a second aspect of the present disclosure, a method for timer adjustment is provided. The method is applied to a terminal, and a base station configures a BWP inactivity timer for the terminal. The method includes that the terminal receives timer adjustment information sent by the base station. The timer adjustment information is configured to adjust a duration of the BWP inactivity timer. Additionally, the terminal adjusts the duration of the BWP inactivity timer according to the timer adjustment information.

According to a third aspect of the present disclosure, a non-transitory computer readable storage medium is provided. The storage medium is stored thereon with a computer program. The computer program is configured to execute the method for timer adjustment provided in the first aspect above.

According to a fourth aspect of the present disclosure, a non-transitory computer readable storage medium is provided. The storage medium is stored thereon with a computer program. The computer program is configured to execute the method for timer adjustment provided in the second aspect above.

According to a fifth aspect of the present disclosure, a base station is provided. The base station configures a BWP inactivity timer for a terminal. The base station includes a processor and a memory configured to store instructions executable by the processor. The processor is configured to determine to adjust a duration of the BWP inactivity timer and configure timer adjustment information for the terminal. The timer adjustment information is configured to adjust the duration of the BWP inactivity timer. Further, the processor is configured to send the timer adjustment information to the terminal, so that the terminal adjusts the duration of the BWP inactivity timer according to the timer adjustment information.

According to a sixth aspect of the present disclosure, a terminal is provided. The terminal is configured with a BWP inactivity timer by the base station. The terminal include a processor and a memory configured to store instructions executable by the processor. The processor is configured to receive timer adjustment information sent by the base station. The timer adjustment information is configured to adjust a duration of the BWP inactivity timer. The processor is further configured to adjust the duration of the BWP inactivity timer according to the timer adjustment information.

It should be noted that, the details above and in the following are exemplary and illustrative, and do not constitute the limitation on the present disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

The terms described in this disclosure are only for the purpose of describing specific embodiments and are not intended to restrict the present disclosure. The singular forms "a", "the" and "said" used in the disclosure and the attached claim are also intended to include plural forms, unless the context clearly indicates otherwise. It should also be understood that the term "and/or" used in this disclosure means and includes any or all possible combinations of one or more associated listed items.

It should be understood that, although the terms first, second, third, etc. may be used in this disclosure to describe various information, such information shall not be limited to these terms. These terms are only used to distinguish the same type of information. For example, subject to the scope of this present disclosure, first information may also be referred to as second information, and similarly, and second information may also be referred to as first information. It depends on the context. For example, the word "if" as used herein may be interpreted as "in a case that" or "when" or "in response to determining".

Figure 1:
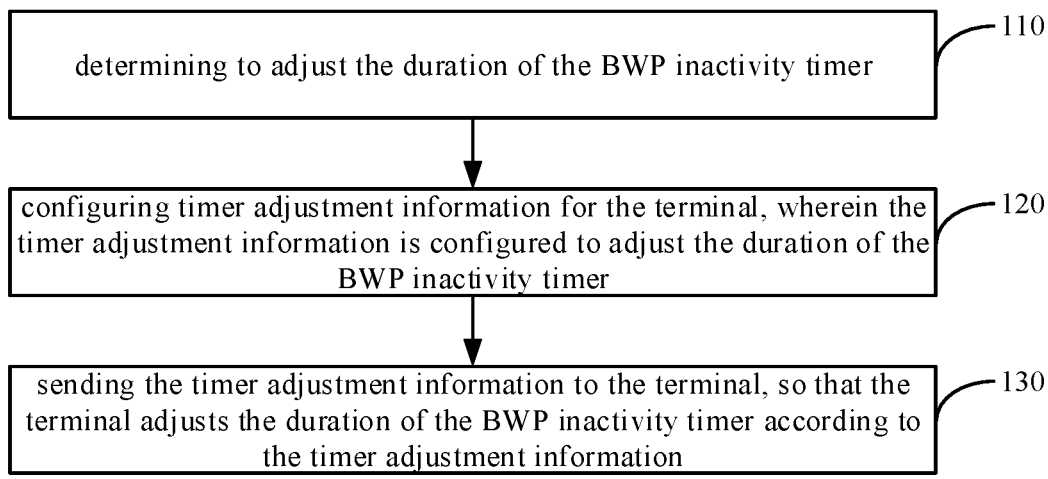
FIG. 1 is a flowchart illustrating a method for timer adjustment according to an example embodiment.
Figure 2:
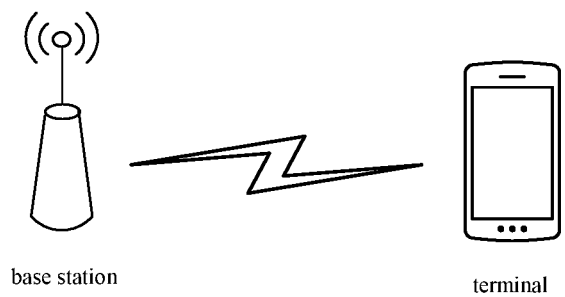
FIG. 2 is a schematic diagram illustrating a scenario where a method for timer adjustment is applied according to an example embodiment.

FIG. 1 is a flowchart illustrating a method for timer adjustment according to an example embodiment. FIG. 2 is a schematic diagram illustrating a scenario where a method for timer adjustment is applied according to an example embodiment. The method for timer adjustment may be applied to a base station. The base station configures a BWP inactivity timer for a terminal. As illustrated in FIG. 1, the method for timer adjustment may include the following steps 110-130.

At step 110, it is determined to adjust a duration of the BWP inactivity timer.

In embodiments of the present disclosure, if the base station configures the BWP inactivity timer for the terminal, it means that a function of automatic rollback from a currently activated BWP to a default BWP or an initial BWP is enabled. The base station may dynamically adjust the duration of the BWP inactivity timer according to the actual situation, for example, extend the duration or shorten the duration.

The function of automatic rollback to the default BWP or the initial BWP is as follows. If the currently activated BWP is inactive for a period of time, it will cause the BWP inactivity timer to be started, and the terminal will not automatically roll back from the currently activated BWP to the default BWP until the started BWP inactivity timer times out. If the default BWP is not configured, the terminal will automatically roll back to the initial BWP. The default BWP may be a small BWP specially configured by the base station for the terminal based on power saving reasons.

At step 120, timer adjustment information is configured for the terminal, in which the timer adjustment information is configured to adjust the duration of the BWP inactivity timer.

In embodiments of the present disclosure, when the base station determines to adjust the duration of the BWP inactivity timer, timer adjustment information may be configured for adjusting the duration of the BWP inactivity timer.

In an embodiment, the timer adjustment information may include the duration after adjusting the duration of the BWP inactivity timer and configured by the base station for the terminal. For example, the duration after adjustment is 10 s, that is, the base station indicates the terminal to adjust the duration of the BWP inactivity timer as 10 s.

In an embodiment, the timer adjustment information may include a time length configured by the base station for the terminal to extend or shorten the duration of the BWP inactivity timer. For example, the extended time length is 2 s. If the duration before adjusting the BWP inactivity timer is 10 s, the duration after adjusting the BWP inactivity timer is 12 s.

In an embodiment, the timer adjustment information may include the indication for the duration after adjusting the duration of the BWP inactivity timer that the base station configures for the terminal. For example, the candidate duration set includes {5 s, 8 s, 10 s}, and the indication for the duration after adjustment is the second in the candidate duration set, it means that the duration after adjustment is 8 s.

At step 130, the timer adjustment information is sent to the terminal, so that the terminal adjusts the duration of the BWP inactivity timer according to the timer adjustment information.

In an example scenario, as shown in FIG. 2, a base station and a terminal are included. When the base station determines to adjust the duration of the BWP inactivity timer after configuring the duration of the BWP inactivity timer for the terminal, the base station may configure timer adjustment information for the terminal. The timer adjustment information is configured to adjust the duration of the BWP inactivity timer. The base station sends the timer adjustment information to the terminal, so that the terminal may adjust the duration of the BWP inactivity timer according to the timer adjustment information.

As can be seen from the above embodiments, the timer adjustment information may be configured for the terminal when determining to adjust the duration of BWP inactivity timer, in which the timer adjustment information is configured to adjust the duration of the BWP inactivity timer, and the timer adjustment information is sent to the terminal, so that the terminal may adjust the duration of the BWP inactivity timer according to the timer adjustment information, thus achieving dynamic adjustment of the duration of the BWP inactivity timer and saving energy consumption.

Figure 3:
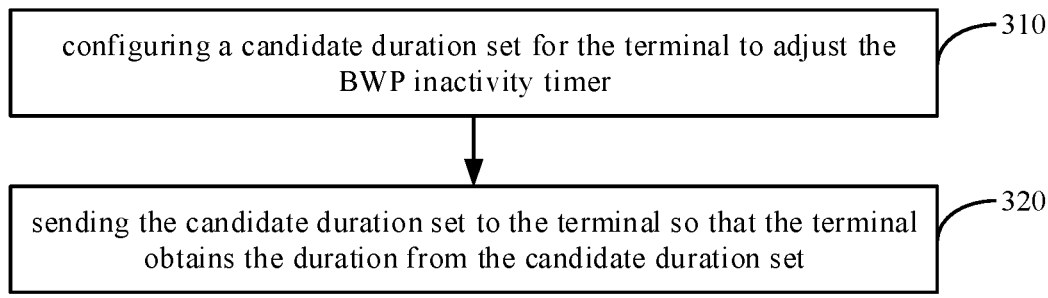
FIG. 3 is a flowchart illustrating another method for timer adjustment according to an example embodiment.

FIG. 3 is a flowchart illustrating another method for timer adjustment according to an example embodiment. The method for timer adjustment may be applied to a base station and established on the basis of the method as shown in FIG. 1, in which the base station configures the BWP inactivity timer for the terminal. As illustrated in FIG. 3, the method for timer adjustment may include the following steps 310-320:

At step 310, a candidate duration set is configured for the terminal to adjust the BWP inactivity timer.

In embodiments of the present disclosure, the base station may configure the candidate duration set in advance according to the actual situation and send the candidate duration set to the terminal, so that the terminal may obtain the duration from the candidate duration set. For example, the timer adjustment information includes the indication used to represent the duration after adjustment, so that the terminal may obtain the corresponding duration from the candidate time set according to the indication.

In an embodiment, at step 310, the content of the candidate duration set may include but not limited to two implementations as follows.

Implementation 1: one or more different candidate durations. For example, the candidate duration set includes {5 s, 8 s, 10 s}, that is, the candidate duration set includes these three different candidate durations of 5 s, 8 s, 10 s.

Implementation 2: a first candidate duration, and scaling factors of other candidate durations relative to the first candidate duration. For example, different candidate durations are 5 s, 8 s, 10 s. At this time, 5 s may be the first candidate duration (that is, reference candidate duration), and the scaling factor of 8 s to 5 s is 1.6, the scaling factor of 10 s to 5 s is 2, so the candidate duration set is {5 s, 1.6, 2}.

At step 320, the candidate duration set is sent to the terminal, so that the terminal obtains the duration from the candidate duration set.

In an embodiment, at step 320, the base station may send the candidate duration set to the terminal through system information or a dedicated signaling. The detailed implementation process may include:

(1-1) adding the candidate duration set to the system information or the dedicated signaling;

(1-2) adding the system information or dedicated signaling carrying the candidate duration set to the terminal, so that the terminal obtains the candidate duration set from the system information or dedicated signaling.

As can be seen from the above embodiments, the candidate duration set may be configured for the terminal to adjust the duration of the BWP inactivity timer, and sent to the terminal, so that the terminal obtains the duration from the candidate duration set, thus improving the efficiency of adjusting the timer.

Figure 4:
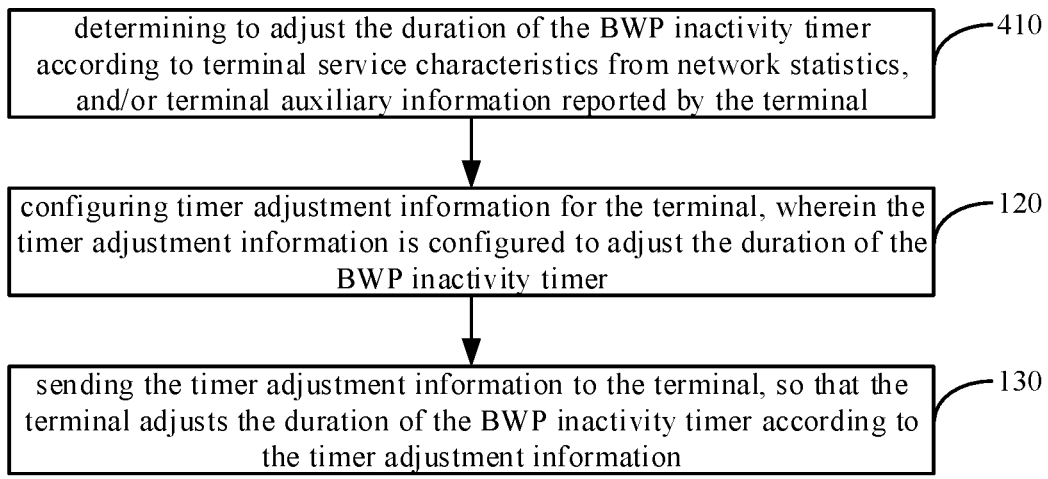
FIG. 4 is a flowchart illustrating another method for timer adjustment according to an example embodiment.

FIG. 4 is a flowchart illustrating another method for timer adjustment according to an example embodiment. The method for timer adjustment may be applied to a base station and established on the basis of the method as shown in FIG. 1, in which the base station configures a BWP inactivity timer for the terminal. As illustrated in FIG. 4, when executing step 110, following step 410 may be included.

At step 410, it is determined to adjust the duration of the BWP inactivity timer according to terminal service characteristics from network statistics, and/or terminal auxiliary information reported by the terminal.

In an embodiment, terminal service characters in the above step 410 may be determined according to but not limited to the following implementation.

(2-1) The base station determines the terminal service characters according to historical statistic information or Quality of Service (QoS) parameters sent by the core network device; and/or (2-2) the base station determines the terminal service characters according to a buffer data capacity carried in a buffer status report (BSR) reported by the terminal or a scheduling request (SR).

In an embodiment, the terminal auxiliary information in the above step 410 may include but not limited to:

(3-1) Power Preference Indication (PPI) of the terminal; and/or (3-2) uplink service characteristics.

In an embodiment, the terminal auxiliary information in the above step 410 may include but not limited to at least one of:

(4-1) first information, configured to represent a specified duration expected by the terminal;

(4-2) second information, configured to represent a time length expected by the terminal for extending or shortening the BWP inactivity timer; and (4-3) third information, configured to represent an indication of a duration expected by the terminal after adjusting the BWP inactivity timer.

As can be seen from the above embodiments, the adjustment of the duration of the BWP inactivity timer may be determined according to the terminal service characteristics from network statistics, and/or terminal auxiliary information reported by the terminal, thus improving the accuracy of timer adjustment.

Figure 5:
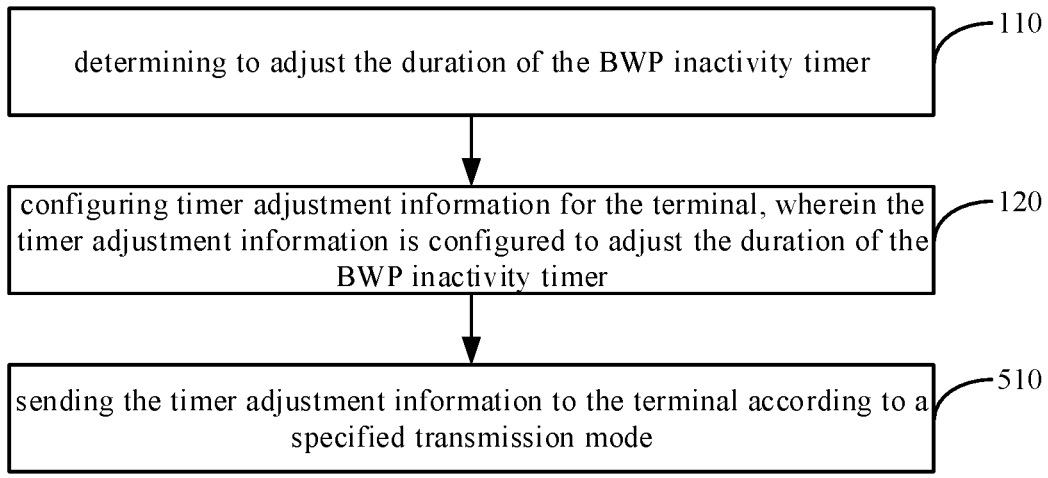
FIG. 5 is a flowchart illustrating another method for timer adjustment according to an example embodiment.

FIG. 5 is a flowchart illustrating another method for timer adjustment according to an example embodiment. The method for timer adjustment may be applied to a base station and established on the basis of the method shown in FIG. 1. The base station configures a BWP inactivity timer for the terminal. As illustrated in FIG. 5, when executing step 130, it may include the following step 510.

At step 510, the timer adjustment information is sent to the terminal according to a specified transmission mode.

The specified transmission mode at step 510 may include but not limited to at least one of:

(5-1) a Radio Resource Control (RRC) signaling, wherein the RRC signaling includes the timer adjustment information;

(5-2) a Medium Access Control-Control Element (MAC-CE) mode, wherein the MAC-CE includes the timer adjustment information;

(5-3) a Downlink Control Indicator (DCI) mode.

In an embodiment, the DCI mode in the above (5-3) may include but not limited to at least one of:

(6-1) a first DCI configured to inform the terminal of BWP switch, wherein the first DCI includes the timer adjustment information;

(6-2) a second DCI configured to transmit an uplink and downlink license, wherein the second DCI includes a specified field for carrying the timer adjustment information;

(6-3) a third DCI dedicated to carrying the timer adjustment information, wherein a DCI format of the third DCI is different from a DCI format of the first DCI and a DCI format of the second DCI.

The specified field in the above (6-2) may be a new field; the DCI format of the third DCI in the above (6-3) may be a new DCI format solely defined.

As can be seen from the above embodiments, the timer adjustment information may be sent to the terminal according to the specified transmission mode, so that it is convenient for the terminal to receive the timer adjustment information according to the specified transmission mode, thus improving the reliability of timer adjustment.

Figure 6:
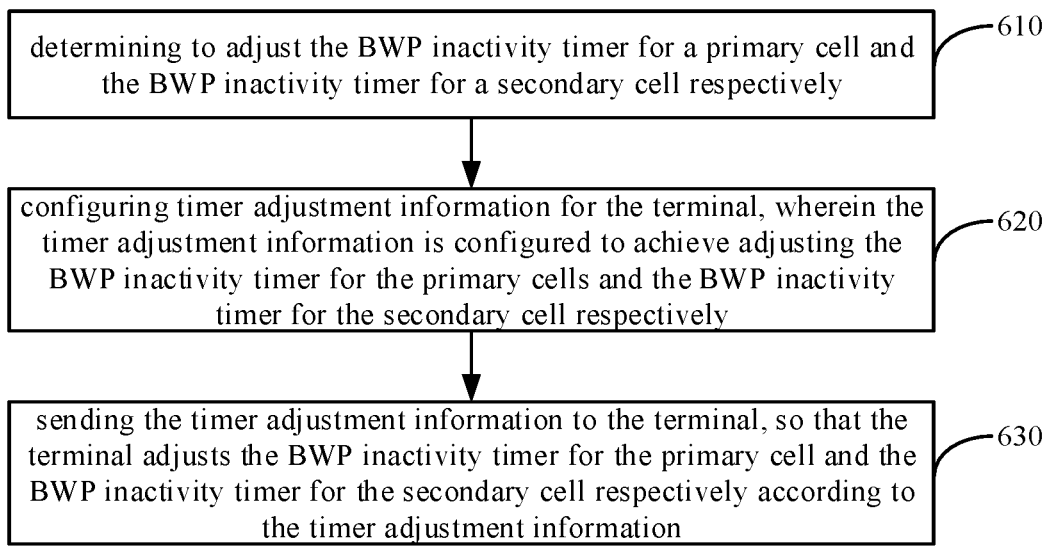
FIG. 6 is a flowchart illustrating another method for timer adjustment according to an example embodiment.

FIG. 6 is a flowchart illustrating another method for timer adjustment according to an example embodiment. The method for timer adjustment may be applied to a base station and established on the basis of the method as shown in FIG. 1. The base station configures a BWP inactivity timer for the terminal. In an embodiment, the BWP inactivity timer corresponds to the service cells serving the terminal, and timer adjustments corresponding to different service cells are respectively executed. In an embodiment, the service cells include a primary cell and a secondary cell for carrier aggregation (CA). As illustrated in FIG. 6, when executing step 110, it may include the following step 610.

At step 610, it is determined to adjust the BWP inactivity timer for the primary cell and the BWP inactivity timer for the secondary cell.

Accordingly, when executing step 120, it may include the following step 620.

At step 620, timer adjustment information is configured for the terminal, wherein the timer adjustment information is configured to adjust the BWP inactivity timer for the primary cell and the BWP inactivity timer for the secondary cell respectively.

Accordingly, when executing step 120, it may include the following step 630.

At step 630, the timer adjustment information is sent to the terminal, so that the terminal adjusts the BWP inactivity timer for the primary cell and the BWP inactivity timer for the secondary cell respectively according to the timer adjustment information.

As can be seen from the above embodiments, in a CA scenario, when determining to adjust the BWP inactivity timer for the primary cell and the BWP inactivity timer for the secondary cell respectively, timer adjustment information may be configured for the terminal, in which the timer adjustment information is configured to adjust the BWP inactivity timer for the primary cell and the BWP inactivity timer for the secondary cell respectively, and the timer adjustment information is sent to the terminal, so that the terminal may adjust the BWP inactivity timer for the primary cell and the BWP inactivity timer for the secondary cell respectively according to the timer adjustment information, thus expanding the application scope of the timer adjustment and improving the practicality of timer adjustment.

Figure 7:
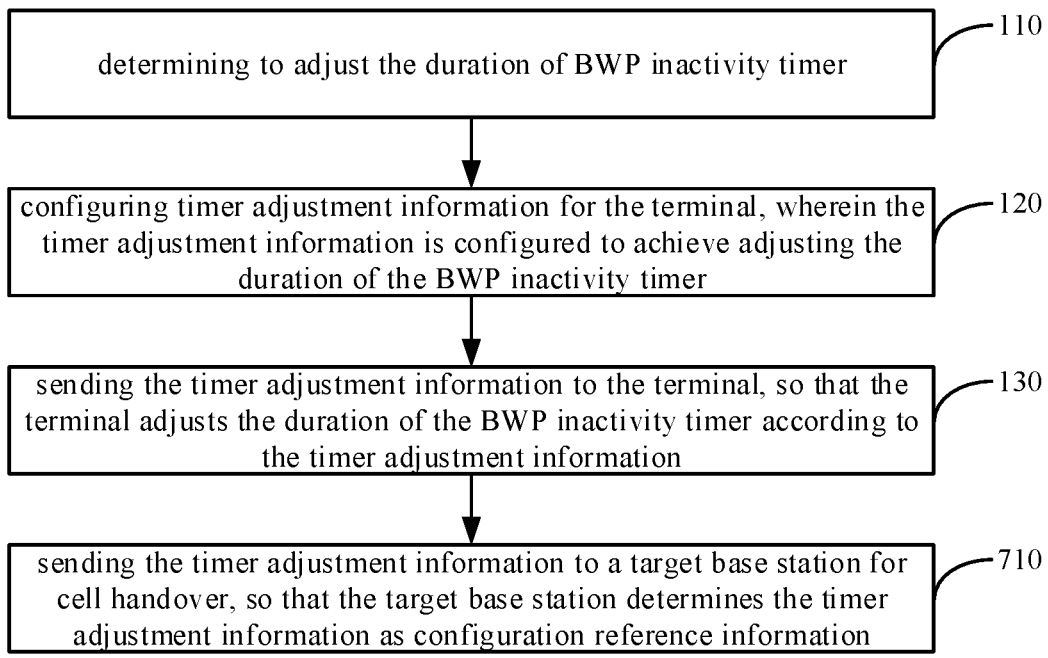
FIG. 7 is a flowchart illustrating another method for timer adjustment according to an example embodiment.

FIG. 7 is a flowchart illustrating another method for timer adjustment according to an example embodiment. The method for timer adjustment may be applied to a base station and established on the basis of the method as shown in FIG. 1. The base station configures a BWP inactivity timer for the terminal, and the base station is a source base station configured for cell handover. As illustrated in FIG. 7, the method for timer adjustment may further include the following step 710.

At step 710, the timer adjustment information is sent to a target base station for cell handover, so that the target base station determines the timer adjustment information as configuration reference information.

In embodiments of the present disclosure, during cell handover, the source base station may send the timer adjustment information configured for the terminal to the target base station, so that the target base station may use the timer adjustment information as configuration reference.

In an embodiment, the timer adjustment information in the above step 710 may include but not limited to at least one of:

(7-1) fourth information, configured to represent a duration of a BWP inactivity timer currently configured by the base station for the terminal;

(7-2) fifth information, configured to represent a duration configured by the base station for the terminal with a frequency exceeding a set frequency threshold.

The set frequency threshold in the above (7-2) may be a threshold determined by the terminal according to the actual situation. For example, the set frequency threshold is 5 times. If the duration of the BWP inactivity timer configured by the base station for the terminal is 5 s, and is configured for the terminal 6 times, the BWP inactivity timer of 5 s is deemed as the BWP inactivity timer with high using frequency, and the source base station may inform the target base station of the BWP inactivity timer of 5 s, thus providing configuration reference for the target base station to configure the duration of the BWP inactivity timer for the terminal.

As can be seen from the above embodiments, the timer adjustment information may be sent to the target base station during cell handover, so that the target base station may determine the timer adjustment information as configuration reference information, thus achieving information sharing among different base stations and improving the accuracy of timer adjustment.

Figure 8:
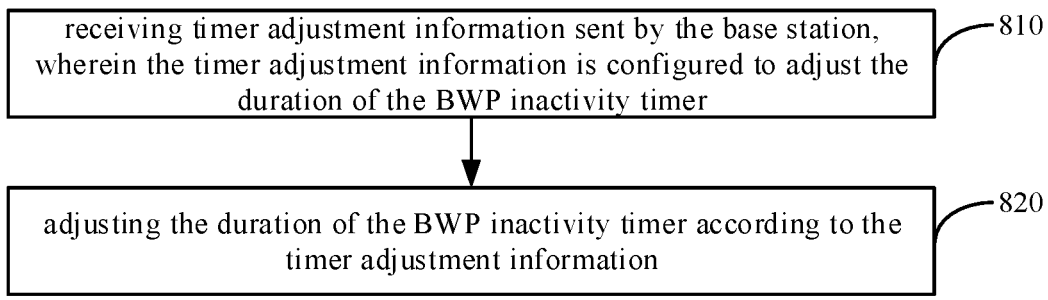
FIG. 8 is a flowchart illustrating a method for timer adjustment according to an example embodiment.

FIG. 8 is a flowchart illustrating a method for timer adjustment according to an example embodiment. The method for timer adjustment may be applied to a terminal, and the base station configures a BWP inactivity timer for the terminal. As illustrated in FIG. 8, the method for timer adjustment may include the following steps 810-820.

At step 810, timer adjustment information sent by the base station is received, in which the timer adjustment information is configured to adjust a duration of the BWP inactivity timer.

At step 820, the duration of the BWP inactivity timer is adjusted according to the timer adjustment information.

In an embodiment, when executing step 820, the duration of the BWP inactivity timer may be adjusted in different ways according to whether the BWP inactivity timer is in a running state, including but not limited to following two ways.

Way 1: (1) it is judged whether the BWP inactivity timer is in the running state; (2) in response to determining that the BWP inactivity timer is in the running state, the BWP inactivity timer is not restarted, and the duration of the BWP inactivity timer is adjusted according to the timer adjustment information until the BWP inactivity timer times out; (3) in response to determining that the BWP inactivity timer is not configured or not in the running state, the duration of the BWP inactivity timer is adjusted according to the timer adjustment information.

In this way, in response to determining that the BWP inactivity timer is in the running state, the original timer may be maintained and work is performed based on the original timer. When next time there is a need to restart the BWP inactivity timer, the BWP inactivity timer is restarted to work according to the BWP inactivity timer indicated in the timer adjustment information.

Way 2: (1) it is judged whether the BWP inactivity timer is in the running state; (2) in response to determining that the BWP inactivity timer is in the running state, the BWP inactivity timer is terminated, that is, the BWP inactivity timer is deemed timeout, and the duration of the BWP inactivity timer is adjusted according to the timer adjustment information; (3) in response to determining that the BWP inactivity timer is not configured or not in the running state, the duration of the BWP inactivity timer is adjusted according to the timer adjustment information.

In this way, in response to determining that the BWP inactivity timer is in the running state, the BWP inactivity timer is terminated, that is, the BWP inactivity timer is deemed timeout, and the duration of the BWP inactivity timer is adjusted according to the timer adjustment information.

As can be seen from the above embodiments, the timer adjustment information configured to adjust the duration of the BWP inactivity timer sent by the base station is received, and the duration of the BWP inactivity timer is adjusted according to the timer adjustment information, thus achieving dynamic adjustment of the duration of the BWP inactivity timer and saving energy consumption.

The disclosure further provides embodiments of the apparatus for time adjustment corresponding to the aforementioned embodiments of the method for timer adjustment.

Figure 9:
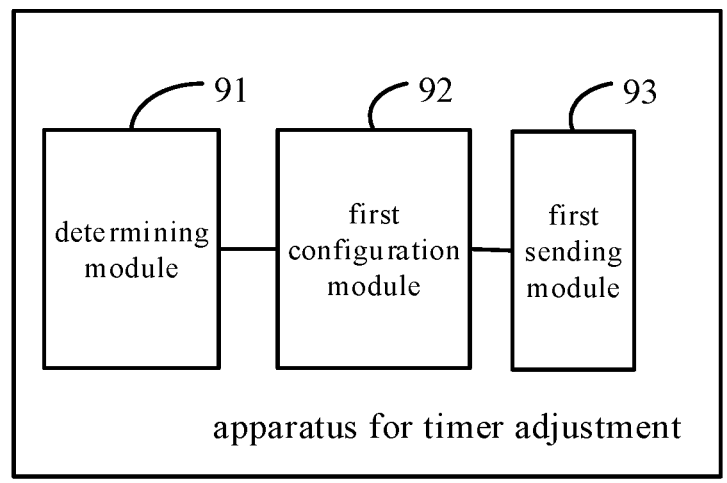
FIG. 9 is a block diagram illustrating an apparatus for timer adjustment according to an example embodiment.

FIG. 9 is a block diagram illustrating an apparatus for timer adjustment according to an example embodiment. The apparatus is applied to a base station. The base station configures a BWP inactivity timer for the terminal. The apparatus is configured to implement the method for timer adjustment as shown in FIG. 1. As illustrated in FIG. 9, the apparatus for timer adjustment may include a determining module 91, a first configuration module 92 and a first sending module 93.

The determining module 91 is configured to determine to adjust a duration of the BWP inactivity timer.

The first configuration module 92 is configured to configure timer adjustment information for the terminal, wherein the timer adjustment information is configured to adjust the duration of the BWP inactivity timer.

The first sending module 93 is configured to send the timer adjustment information to the terminal, so that the terminal adjusts the duration of the BWP inactivity timer according to the timer adjustment information.

As can be seen from the above embodiments, the timer adjustment information may be configured for the terminal when determining to adjust the duration of BWP inactivity timer, in which the timer adjustment information is configured to adjust the duration of the BWP inactivity timer, and the timer adjustment information is sent to the terminal, so that the terminal may adjust the duration of the BWP inactivity timer according to the timer adjustment information, thus achieving dynamic adjustment of the duration of the BWP inactivity timer and saving energy consumption.

Figure 10:
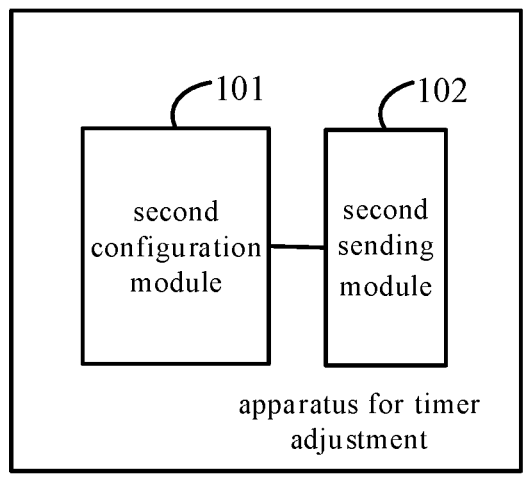
FIG. 10 is a block diagram illustrating another apparatus for timer adjustment according to an example embodiment.

In an embodiment, on the basis of the apparatus as shown in FIG. 9, as illustrated in FIG. 10, the apparatus may further include a second configuration module 101 and a second sending module 102.

The second configuration module 101 is configured to configure a candidate duration set for adjusting the duration of the BWP inactivity timer for the terminal.

The second sending module 102 is configured to send the candidate duration set to the terminal, so that the terminal obtains the duration from the candidate duration length.

As can be seen from the above embodiments, the candidate duration set may be configured for the terminal to adjust the duration of the BWP inactivity timer, and the candidate duration set may be sent to the terminal, so that the terminal obtains the duration from the candidate duration set, thus improving the efficiency of the timer adjustment.

In an embodiment, on the basis of the apparatus as shown in FIG. 10, the candidate duration set may include:
one or more different candidate durations; or
a first candidate duration, and scaling factoring of other candidate durations relative to the first candidate duration.

Figure 11:
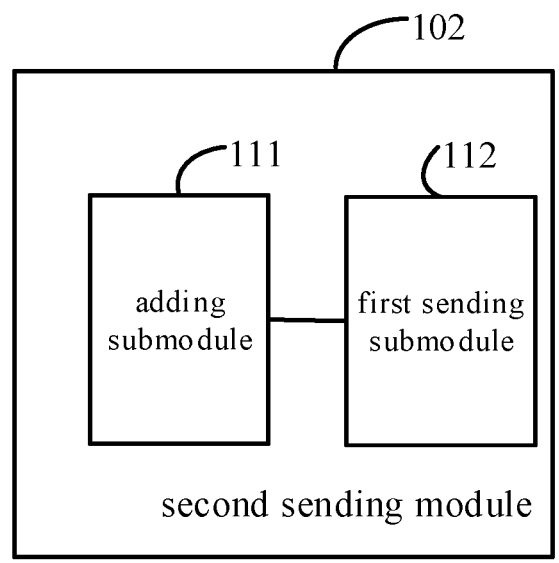
FIG. 11 is a block diagram illustrating another apparatus for timer adjustment according to an example embodiment.

In an embodiment, on the basis of the apparatus as shown in FIG. 10, as illustrated in FIG. 11, the second sending module 102 may include an adding submodule 111 and a first sending submodule 112.

The adding submodule 111 is configured to add the candidate duration set to system information or a dedicated signaling.

The first sending submodule 112 is configured to send the system information or the dedicated signaling carrying the candidate duration set to the terminal, so that the terminal obtains the candidate duration set from the system information or the dedicated signaling.

Figure 12:
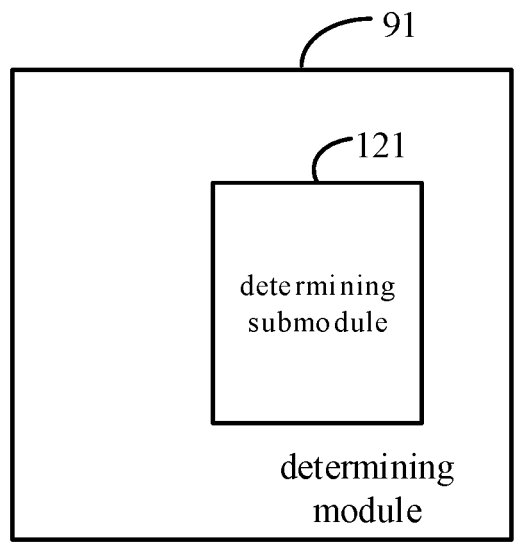
FIG. 12 is a block diagram illustrating another apparatus for timer adjustment according to an example embodiment.

In an embodiment, on the basis of the apparatus as shown in FIG. 9, as illustrated in FIG. 12, the determining module 91 may include a determining submodule 121.

The determining submodule 121 is configured to determine to adjust the duration of the BWP inactivity timer according to terminal service characteristics from network statistics, and/or terminal auxiliary information reported by the terminal.

As can be seen from the above embodiments, the adjustment of the duration of the BWP inactivity timer may be determined according to terminal service characteristics from network statistics, and/or terminal auxiliary information reported by the terminal, thus improving the accuracy of timer adjustment.

In an embodiment, on the basis of the apparatus as shown in FIG. 12, the terminal service characteristics may be determined by the base station according to historical statistical information or Quality of Service (QoS) parameters sent by a core network device; and/or determined by the base station according to a buffer data capacity carried in a buffer status report (BSR) reported by the terminal or a scheduling request (SR).

In an embodiment, on the basis of the apparatus as shown in FIG. 12, the terminal auxiliary information may include Power Preference Indication (PPI) and/or uplink service characteristics of the terminal.

In an embodiment, on the basis of the apparatus as shown in FIG. 12, the terminal auxiliary information may include at least one of:
first information, configured to represent a specified duration expected by the terminal;
second information, configured to represent a time length expected by the terminal for extending or shortening the BWP inactivity timer; and
third information, configured to represent an indication of a duration expected by the terminal after adjusting the BWP inactivity timer.

Figure 13:
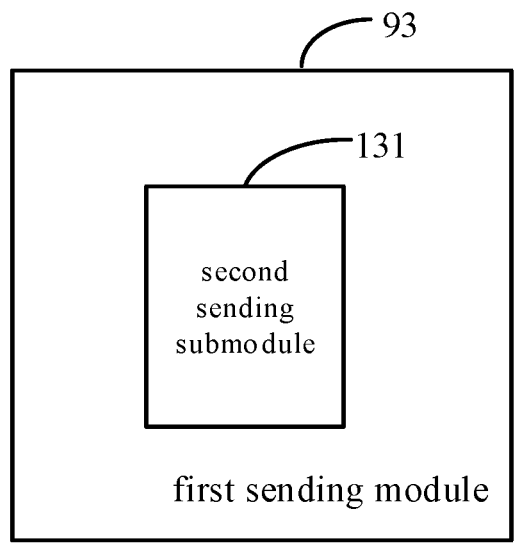
FIG. 13 is a block diagram illustrating another apparatus for timer adjustment according to an example embodiment.

In an embodiment, on the basis of the apparatus as shown in FIG. 9, as illustrated in FIG. 13, the first sending module 93 may include a second sending submodule 131.

The second sending submodule 131 is configured to send the timer adjustment information to the terminal according to a specified transmission mode. The specified transmission mode includes at least one of:
a RRC signaling, wherein the RRC signaling includes the timer adjustment information;
a MAC-CE mode, wherein the MAC-CE includes the timer adjustment information; and
a DCI mode.

In an embodiment, on the basis of the apparatus as shown in FIG. 13, the DCI mode may include at least one of:
a first DCI configured to inform the terminal of BWP switch, wherein the first DCI includes the timer adjustment information;

a second DCI including a specified field, wherein the specified field is configured to carry the timer adjustment information; and a third DCI dedicated to carrying the timer adjustment information, wherein a DCI format of the third DCI is different from a DCI format of the first DCI and a DCI format of the second DCI.

As can be seen from the above embodiments, the timer adjustment information may be sent to the terminal according to the specified transmission mode, so that it is convenient for the terminal to receive the timer adjustment information according to the specified transmission mode, thus improving the reliability of timer adjustment.

In an embodiment, on the basis of the apparatus as shown in FIG. 9, the BWP inactivity timer corresponds to service cells serving the terminal, and the timer adjustments corresponding to different service cells are executed separately.

In an embodiment, on the basis of the apparatus as shown in FIG. 9, the BWP inactivity timer corresponds to service cells serving the terminal. The timer adjustments corresponding to different service cells are executed separately. The service cells include a primary cell and a secondary cell for CA.

As can be seen in the above embodiments, in the CA scenario, when determining to adjust the BWP inactivity timer for the primary cell and the BWP inactivity timer for the secondary cell respectively, timer adjustment information may be configured for the terminal, in which the timer adjustment information is configured to adjust the BWP inactivity timer for the primary cell and the BWP inactivity timer for the secondary cell respectively, and the timer adjustment information is sent to the terminal, so that the terminal may adjust the BWP inactivity timer for the primary cell and the BWP inactivity timer for the secondary cell respectively according to the timer adjustment information, thus expanding the application scope of the timer adjustment and improving the practicality of timer adjustment.

Figure 14:
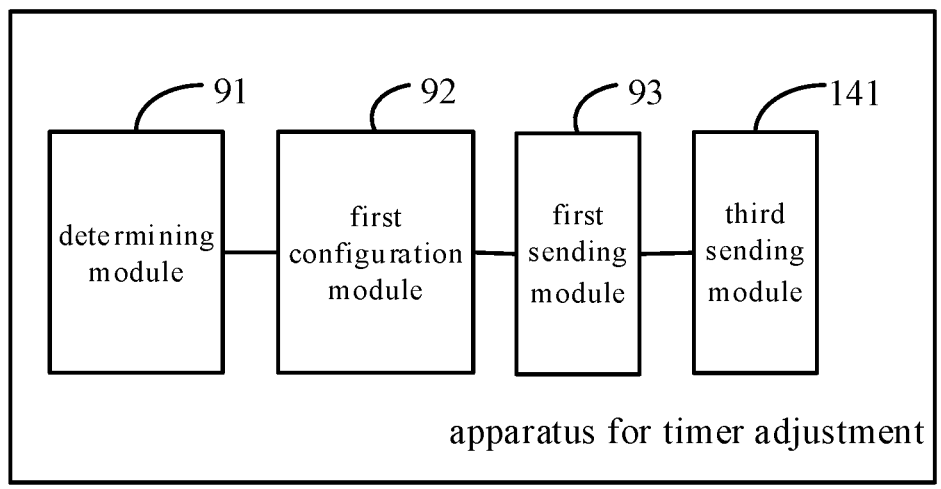
FIG. 14 is a block diagram illustrating another apparatus for timer adjustment according to an example embodiment.

In an embodiment, on the basis of the apparatus as shown in FIG. 9, as illustrated in FIG. 14, the base station is a source base station, and the apparatus may further include a third sending module 141.

The third sending module 141 is configured to send the timer adjustment information to a target base station for cell handover, so that the target base station determines the timer adjustment information as configuration reference information.

In an embodiment, on the basis of the apparatus as shown in FIG. 14, the timer adjustment information may include at least one of:

fourth information, configured to represent a duration of a BWP inactivity timer currently configured by the base station for the terminal;

fifth information, configured to represent a duration configured by the base station for the terminal with a frequency exceeding a set frequency threshold.

As can be seen from the above embodiments, the timer adjustment information may be sent to the target base station during cell handover, so that the target base station may determine the timer adjustment information as configuration reference information, thus achieving information sharing among different base stations and improving the accuracy of timer adjustment.

Figure 15:
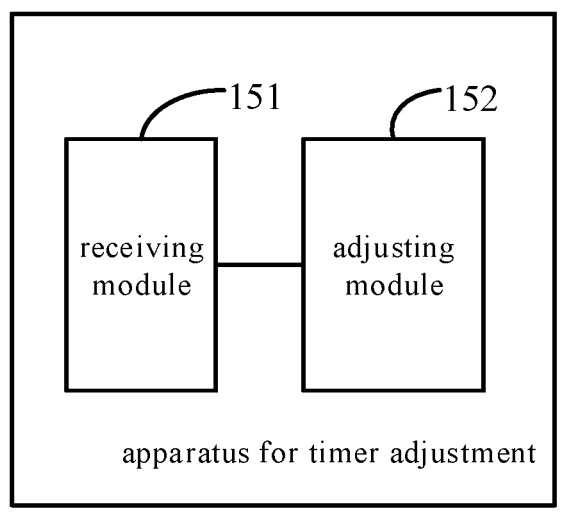
FIG. 15 is a block diagram illustrating an apparatus for timer adjustment according to an example embodiment.

FIG. 15 is a block diagram illustrating an apparatus for timer adjustment according to an example embodiment. The apparatus is applied to a terminal. The terminal is configured with a BWP inactivity timer by a base station. The apparatus is configured to implement the method for timer adjustment as shown in FIG. 8. As illustrated in FIG. 15, the apparatus for timer adjustment may include a receiving module 151 and an adjusting module 152.

The receiving module 151 is configured to receive timer adjustment information sent by the base station, wherein the timer adjustment information is configured to adjust a duration of the BWP inactivity timer.

The adjusting module 152 is configured to adjust the duration of the BWP inactivity timer according to the timer adjustment information.

Figure 16:
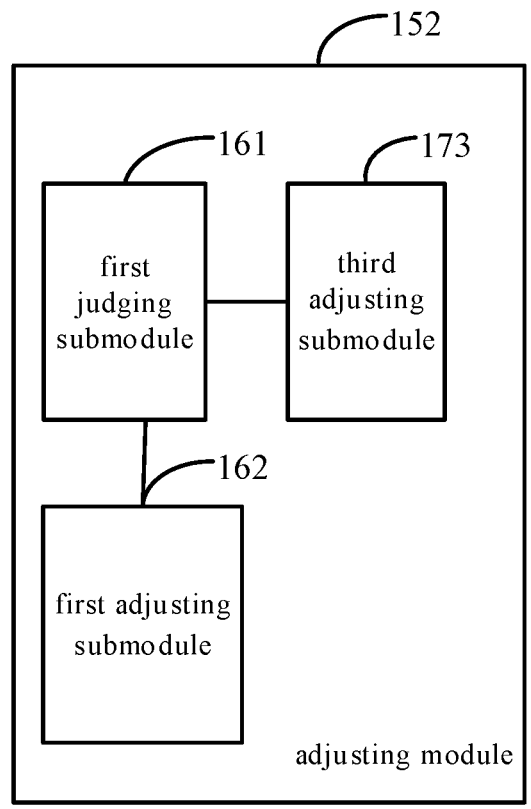
FIG. 16 is a block diagram illustrating another apparatus for timer adjustment according to an example embodiment.

In an embodiment, on the basis of the apparatus as shown in FIG. 15, as illustrated in FIG. 16, the adjusting module 152 may include a first judging submodule 161 and a first adjusting submodule 162.

The first judging submodule 161 is configured to judge whether the BWP inactivity timer is in a running state.

The first adjusting submodule 162 is configured to, in response to determining that the BWP inactivity timer is in the running state, not restart the BWP inactivity timer, and adjust the duration of the BWP inactivity timer according to the timer adjustment information until the BWP inactivity timer times out.

Figure 17:
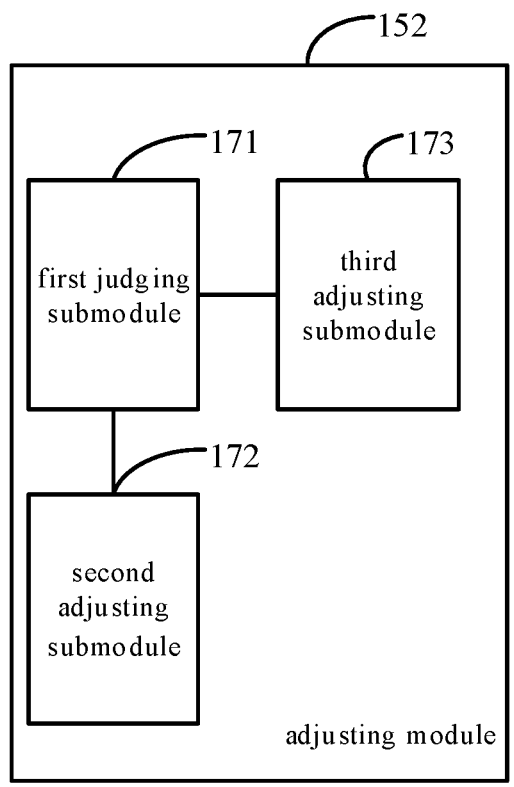
FIG. 17 is a block diagram illustrating another apparatus for timer adjustment according to an example embodiment.

In an embodiment, on the basis of the apparatus as shown in FIG. 15, as illustrated in FIG. 17, the adjusting module 152 may include a second judging submodule 171 and a second adjusting submodule 172.

The second judging submodule 171 is configured to judge whether the BWP inactivity timer is in the running state.

The second adjusting submodule 172 is configured to, in response to determining that the BWP inactivity timer is in the running state, terminate the BWP inactivity timer, that is, deem the BWP inactivity timer as timeout, and adjust the duration of the BWP inactivity timer according to the timer adjustment information.

In an embodiment, as illustrated in FIG. 16 and FIG. 17, the adjusting module 152 may further include a third adjusting submodule 173.

The third adjusting submodule 173 is configured to, in response to determining that the BWP inactivity timer is not configured or not in the running state, adjust the duration of the BWP inactivity timer according to the timer adjustment information.

As can be seen from the above embodiments, the timer adjustment information configured to adjust the duration of the BWP inactivity timer sent by the base station is received, and the duration of the BWP inactivity timer is adjusted according to the timer adjustment information, thus achieving dynamic adjustment of the duration of the BWP inactivity timer and saving energy consumption.

The embodiments of the apparatus are basically corresponding to the embodiments of the method. Thus, for the relevant part, please refer to description of the embodiments of the method. The embodiments of the apparatus described above are only schematic, wherein the above units described as separate parts may or may not be physically separated, the parts shown as units may or may not be physical units, which may be located in one place, or may be distributed to multiple network units. Some or all modules may be selected according to the actual requirements to achieve the purpose of this disclosure. Ordinary technicians in the field could understand and implement it without any creative effort.

Accordingly, the disclosure further provides a non-transitory computer readable storage medium. The storage medium is stored thereon with a computer program. The computer program is configured to implement the above method for timer adjustment as shown in any of FIGS. 1-7.

Accordingly, the disclosure further provides a non-transitory computer readable storage medium. The storage medium is stored thereon with a computer program. The computer program is configured to implement the above method for timer adjustment as shown in FIG. 8.

Accordingly, the disclosure provides an apparatus for timer adjustment. The apparatus is applied to a base station. The base station configures a BWP inactivity timer for a terminal. The apparatus includes:

a processor; and a memory configured to store instructions executable by the processor.

The processor is configured to:

determine to adjust a duration of the BWP inactivity timer;

configure timer adjustment information for the terminal, wherein the timer adjustment information is configured to adjust the duration of the BWP inactivity timer;

send the timer adjustment information to the terminal, so that the terminal adjusts the duration of the BWP inactivity timer according to the timer adjustment information.

Figure 18:
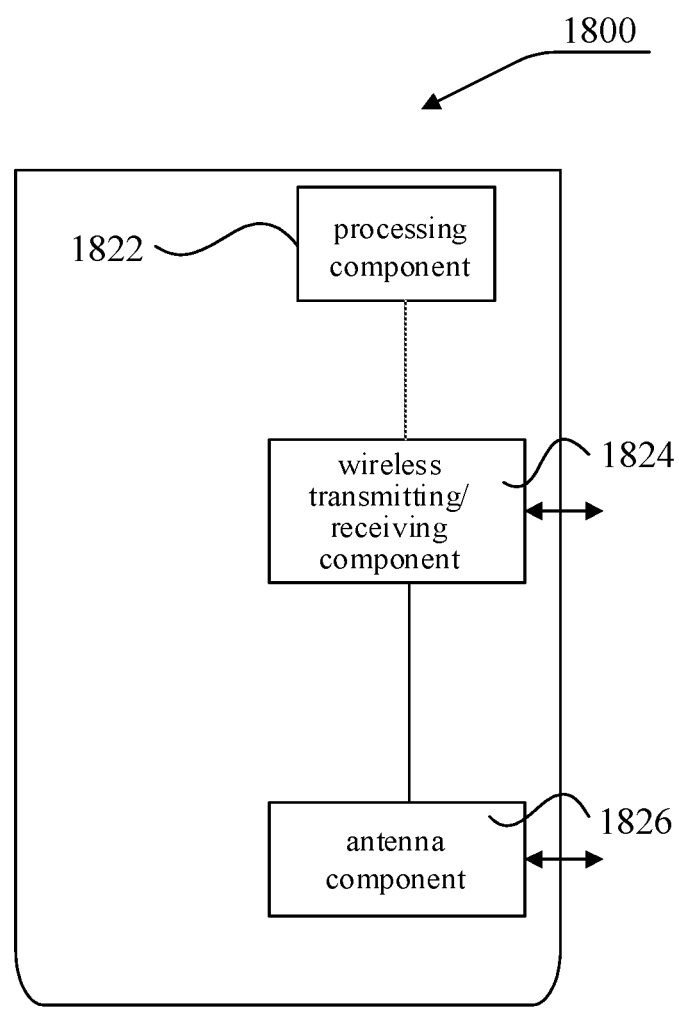
FIG. 18 is a schematic diagram illustrating a structure of an apparatus for timer adjustment according to an example embodiment.

FIG. 18 is a schematic diagram illustrating a structure of an apparatus for timer adjustment according to an example embodiment. The apparatus 1800 may be provided as a base station. Referring to FIG. 18, the apparatus 1800 includes a processing component 182, a wireless transmitting/receiving component 1824, an antenna component 1826, and a signal processing component specific to a wireless interface. The processing component 1822 may further include one or more processors.

One processor of the processing component 1822 may be configured to implement any of the above methods for timer adjustment.

Accordingly, the disclosure further provides an apparatus for timer adjustment. The apparatus is applied to a terminal. A base station configures a BWP inactivity timer for the terminal. The apparatus includes:

a processor; and a memory configured to store instructions executable by the processor.

The processor is configured to:

receive timer adjustment information sent by the base station, wherein the timer adjustment information is configured to adjust a duration of the BWP inactivity timer;

adjust the duration of the BWP inactivity timer according to the timer adjustment information.

Figure 19:
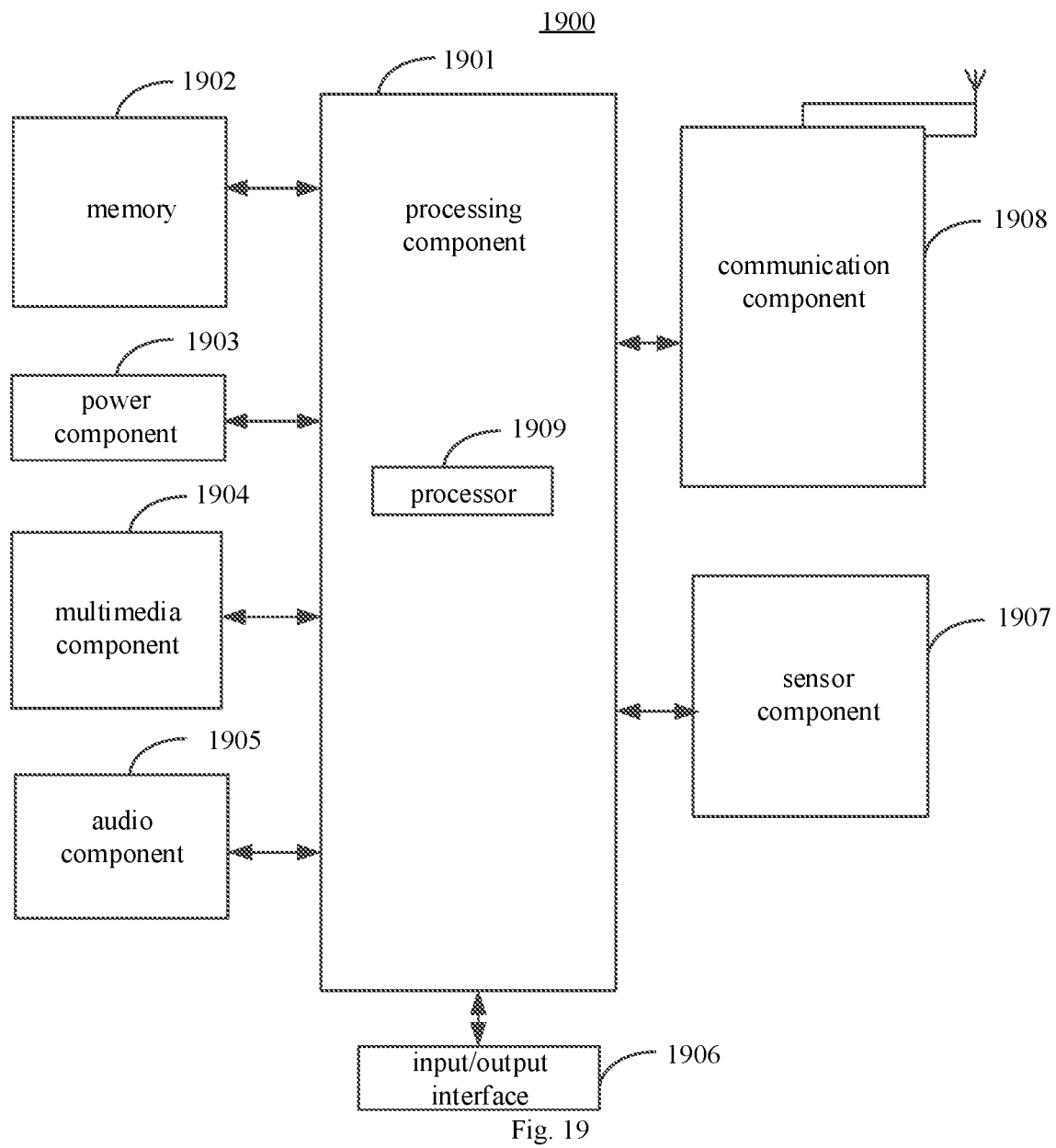
FIG. 19 is a schematic diagram illustrating a structure of an apparatus for timer adjustment according to an example embodiment.

FIG. 19 is a schematic diagram illustrating a structure of an apparatus for timer adjustment according to an example embodiment. As illustrated in FIG. 19, the apparatus 1900 for timer adjustment according to an exemplary embodiment is shown. The apparatus 1900 may be a computer, a mobile phone, a digital broadcasting terminal, a messaging transceiver, a game console, a tablet device, a medical equipment, a fitness equipment, a personal digital assistant, etc.

Referring to FIG. 19, the apparatus 1900 may include one or more of the following components: a processing component 1901, a memory 1902, a power component 1903, a multimedia component 1904, an audio component 1905, an input/output (I/O) interface 1906, a sensor component 1907 and a communication component 1908.

The processing component 1901 typically controls overall operations of the apparatus 1900, such as the operations associated with display, data communications, telephone call, camera operations, and recording operations. The processing component 1901 may include one or more processors 1909 to execute instructions so as to perform all or part of the steps in the above described methods. Moreover, the processing component 1901 may include one or more modules which facilitate the interaction between the processing component 1901 and other components. For instance, the processing component 1901 may include a multimedia module to facilitate the interaction between the multimedia component 1904 and the processing component 1901.

The memory 1902 is configured to store various types of data to support the operation of the apparatus 1900. Examples of such data include instructions for any applications or methods operated on the apparatus 1900, contact data, phonebook data, messages, pictures, videos, etc. The memory 1902 may be implemented using any type of volatile or non-volatile memory device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1903 provides power to various components of the apparatus 1900. The power component 1903 may include a power management system, one or more power sources, and any other components associated with the generation, management, and distribution of power in the apparatus 1900.

The multimedia component 1904 includes a screen providing an output interface between the apparatus 1900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 1904 includes a front camera and/or a rear camera. The front camera and/or the rear camera may receive an external multimedia datum while the apparatus 1900 is in an operation mode, such as a photographing mode or a video mode. Each of the front camera and the rear camera may be a fixed optical lens system or have focus and optical zoom capability.

The audio component 1905 is configured to output and/or input an audio signal. For example, the audio component 1905 includes a microphone ("MIC") configured to receive an external audio signal when the apparatus 1900 is in an operation mode, such as a call mode, a recording mode, and a voice recognition mode. The received audio signal may be further stored in the memory 1902 or transmitted via the communication component 1908. In some embodiments, the audio component 1905 further includes a speaker to output audio signals.

The I/O interface 1906 provides an interface between the processing component 1901 and peripheral interface modules, such as a keyboard, a click wheel, buttons, and the like. The buttons may include, but are not limited to, a home button, a volume button, a starting button, and a locking button.

The sensor component 1907 includes one or more sensors to provide status assessments of various aspects of the apparatus 1900. For instance, the sensor component 1907 may detect an opened/closed status of the apparatus 1900, relative positioning of components (e.g., the display and the keypad) of the apparatus 1900, a change in position of the apparatus 1900 or a component of the apparatus 1900, a presence or absence of user contact with the apparatus 1900, an orientation or an acceleration/deceleration of the apparatus 1900, and a change in temperature of the apparatus 1900. The sensor component 1907 may include a proximity sensor configured to detect the presence of nearby objects without any physical contact. The sensor component 1907 may also include a light sensor, such as a CMOS or CCD image sensor, for use in imaging applications. In some embodiments, the sensor component 1907 may also include an accelerometer sensor, a gyroscope sensor, a magnetic sensor, a pressure sensor, or a temperature sensor.

The communication component 1908 is configured to facilitate wired or wireless communication between the apparatus 1900 and other apparatus. The apparatus 1900 can access a wireless network based on a communication standard, such as WiFi, 2G, or 3G, or a combination thereof. In one exemplary embodiment, the communication component 1908 receives a broadcast signal or broadcast associated information from an external broadcast management system via a broadcast channel. In one exemplary embodiment, the communication component 1908 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as the memory 1902 including instructions, and the instructions are executable by the processor 1909 of the apparatus 1900, for performing the above-described methods. For example, the non-transitory computer-readable storage medium may be a ROM, a RAM (random access memory), a CD-ROM, a magnetic tape, a floppy disc, an optical data storage device, and the like.

When the instructions in the storage medium are executed by the processor, the apparatus 1900 is enabled to implement any of the method for timer adjustment described above.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for timer adjustment, comprising:
    determining, by a base station configuring a band width part (BWP) inactivity timer for a terminal, to adjust a duration of the BWP inactivity timer;
    configuring, by the base station, timer adjustment information for the terminal, wherein the timer adjustment information is configured to adjust the duration of the BWP inactivity timer; and
    sending, by the base station, the timer adjustment information to the terminal, so that the terminal adjusts the duration of the BWP inactivity timer according to the timer adjustment information;
    wherein determining to adjust the duration of the BWP inactivity timer comprises:
    determining to adjust the duration of the BWP inactivity timer according to at least one of following information: terminal service characteristics from network statistics, and terminal auxiliary information reported by the terminal.

2. The method of claim 1, further comprising:
    configuring a candidate duration set for adjusting the BWP inactivity timer for the terminal; and
    sending the candidate duration set to the terminal, so that the terminal obtains the duration from the candidate duration set.

3. The method of claim 2, wherein the candidate duration set comprises:
    one or more different candidate durations; or
    a first candidate duration, and scaling factors of other candidate durations relative to the first candidate duration.

4. The method of claim 2, wherein sending the candidate duration set to the terminal comprises:
    adding the candidate duration set to system information or a dedicated signaling; and
    sending the system information or the dedicated signaling carrying the candidate duration set to the terminal, so that the terminal obtains the candidate duration set from the system information or the dedicated signaling.

5. The method of claim 1, wherein the terminal service characteristics are determined by the base station according to at least one of following information: historical statistical information or Quality of Service (QoS) parameters sent by a core network device; and buffer data capacity carried in a buffer status report (BSR) reported by the terminal or a scheduling request (SR).

6. The method of claim 1, wherein the terminal auxiliary information comprises Power Preference Indication (PPI) or uplink service characteristics of the terminal.

7. The method of claim 1, wherein the terminal auxiliary information comprises at least one of following information:
    first information, configured to represent a specified duration expected by the terminal;
    second information, configured to represent a time length expected by the terminal for extending or shortening the BWP inactivity timer; and
    third information, configured to represent an indication of a duration expected by the terminal after adjusting the BWP inactivity timer.

8. The method of claim 1, wherein sending the timer adjustment information to the terminal comprises:
    sending the timer adjustment information to the terminal according to a specified transmission mode, wherein the specified transmission mode comprises at least one of following modes:

a Radio Resource Control (RRC) signaling, wherein the RRC signaling comprises the timer adjustment information;

a Medium Access Control-Control Element (MAC-CE) mode, wherein the MAC-CE comprises the timer adjustment information; and a Downlink Control Indication (DCI) mode.

9. The method of claim 8, wherein the DCI mode comprises at least one of following DCIs:

a first DCI configured to inform the terminal of BWP switch, wherein the first DCI comprises the timer adjustment information;

a second DCI configured to transmit uplink and downlink license, wherein the second DCI comprises a specified field for carrying the timer adjustment information; and a third DCI dedicated to carrying the timer adjustment information, wherein a DCI format of the third DCI is different from a DCI format of the first DCI and a DCI format of the second DCI.

10. The method of claim 1, wherein the BWP inactivity timer corresponds to service cells serving the terminal, and timer adjustments corresponding to different service cells are executed separately.

11. The method of claim 10, wherein the service cells comprise a primary cell and a secondary cell for carrier aggregation (CA).

12. The method of claim 1, wherein the base station is a source base station for cell handover, and the method comprises:

sending the timer adjustment information to a target base station for cell handover, so that the target base station determines the timer adjustment information as configuration reference information.

13. The method of claim 12, wherein the timer adjustment information comprises at least one of following information:

fourth information, configured to represent the duration of the BWP inactivity timer currently configured by the base station for the terminal; and fifth information, configured to represent a duration configured by the base station for the terminal with a frequency exceeding a set frequency threshold.

14. A method for timer adjustment, comprising:

receiving, by a terminal configured with a band width part (BWP) inactivity timer by a base station, timer adjustment information sent by the base station, wherein the timer adjustment information is configured to adjust a duration of the BWP inactivity timer, wherein the timer adjustment information is sent by the base station in response to determining to adjust the duration of the BWP inactivity timer according to at least one of following information: terminal service characteristics from network statistics, and terminal auxiliary information reported by the terminal; and adjusting, by the terminal, the duration of the BWP inactivity timer according to the timer adjustment information.

15. The method of claim 14, wherein adjusting the duration of the BWP inactivity timer according to the timer adjustment information comprises:

determining whether the BWP inactivity timer is in a running state; and in response to determining that the BWP inactivity timer is in the running state, skipping restarting the BWP inactivity timer, and adjusting the duration of the BWP inactivity timer according to the timer adjustment information until the BWP inactivity timer times out.

16. The method of claim 15, wherein adjusting the duration of the BWP inactivity timer according to the timer adjustment information further comprises:

in response to determining that the BWP inactivity timer is not configured or not in the running state, adjusting the duration of the BWP inactivity timer according to the timer adjustment information.

17. The method of claim 14, wherein adjusting the duration of the BWP inactivity timer according to the timer adjustment information comprises:

determining whether the BWP inactivity timer is in a running state; and in response to determining that the BWP inactivity timer is in the running state, terminating the BWP inactivity timer, and adjusting the duration of the BWP inactivity timer according to the timer adjustment information.

18. A terminal, comprising:

a processor;

a memory configured to store instructions executable by the processor;

wherein, the processor is configured to perform the method of claim 14.

19. A base station, comprising:

a processor;

a memory configured to store instructions executable by the processor;

wherein, the processor is configured to:

determine to adjust a duration of a band width part (BWP) inactivity timer configured by the base station for a terminal;

configure timer adjustment information for the terminal, wherein the timer adjustment information is configured to adjust the duration of the BWP inactivity timer; and send the timer adjustment information to the terminal, so that the terminal adjusts the duration of the BWP inactivity timer according to the timer adjustment information;

wherein the processor is configured to determine to adjust the duration of the BWP inactivity timer by:

determining to adjust the duration of the BWP inactivity timer according to at least one of following information: terminal service characteristics from network statistics, and terminal auxiliary information reported by the terminal.

* * * * *